United States Patent [19]

Erickson

[11] Patent Number: 4,530,429

[45] Date of Patent: Jul. 23, 1985

[54] SELF-PROPELLED, FOLDABLE GRAIN CONVEYOR

[76] Inventor: Vernon G. Erickson, DeLamere, N. Dak. 58022

[21] Appl. No.: 417,541

[22] Filed: Sep. 13, 1982

[51] Int. Cl.[3] .......... B65G 15/26

[52] U.S. Cl. .......... 198/313; 198/314; 198/666

[58] Field of Search .......... 198/304, 306, 313, 314, 198/632, 666, 667, 668, 318, 586, 592, 863, 865

[56] References Cited

U.S. PATENT DOCUMENTS

| | | | |
|---|---|---|---|
| 475,236 | 5/1892 | Compton | 198/863 X |
| 1,232,301 | 6/1917 | Harrington | 198/592 |
| 1,358,024 | 11/1920 | Scranton | 198/865 X |
| 2,303,684 | 12/1942 | Cook | 198/313 |
| 2,393,572 | 1/1946 | Soma | 198/668 |
| 2,397,420 | 3/1946 | Jorgensen | 198/314 |
| 2,425,681 | 8/1947 | Lewis et al. | 198/671 |
| 2,610,727 | 9/1952 | Beldin | 198/667 |
| 2,746,592 | 5/1956 | Wilcoxen | 198/865 X |
| 2,772,767 | 12/1956 | Seifert | 198/666 X |
| 3,084,814 | 4/1963 | Schaefer | 198/865 X |
| 3,189,168 | 6/1965 | Coats et al. | 198/667 |
| 3,249,210 | 5/1966 | Mayrath et al. | 198/667 |
| 3,337,068 | 8/1967 | Meharry | 198/313 X |
| 3,379,301 | 4/1968 | Kopaska | 198/667 |
| 3,550,793 | 12/1970 | Davidow et al. | 198/657 X |
| 3,584,732 | 6/1971 | Tyler et al. | 198/666 X |
| 3,598,224 | 10/1971 | Oury | 198/313 X |
| 3,719,268 | 3/1973 | Koehnen | 198/666 X |
| 3,917,051 | 11/1975 | Pennings et al. | 198/318 X |
| 4,142,621 | 3/1979 | Oliver | 198/318 |
| 4,351,428 | 9/1982 | Long | 198/304 X |
| 4,427,105 | 1/1984 | Hawley et al. | 198/632 |

*Primary Examiner*—Joseph E. Valenza
*Assistant Examiner*—David A. Bucci
*Attorney, Agent, or Firm*—Dorsey & Whitney

[57] ABSTRACT

A self-propelled, foldable grain conveyor that includes an intake conveyor section, an intermediate conveyor section and a discharge conveyor section. The intermediate conveyor section is mounted on a triangular wheel mounted frame. The elevation of both the intake end and the discharge end of the intermediate conveyor section are adjustable independently of the other. The intake conveyor section is pivotally mounted to the intermediate conveyor section. Gears and hydraulic cylinders are provided for pivoting the intake conveyor section with respect to the intermediate conveyor section between an extended work position and a retracted transport position. The discharge conveyor is also pivotally mounted to the intermediate conveyor section and is swung (by hand) between a retracted and extended position. A sweep conveyor section, pivotally mounted to the intake conveyor section, is also provided for optional use.

4 Claims, 11 Drawing Figures

SELF-PROPELLED, FOLDABLE GRAIN CONVEYOR

BACKGROUND OF THE INVENTION

1. Field of the Invention

The present invention is in the field of conveying grain such as wheat, shelled corn, oats and other granular materials from point to point, typically from a storage bin to a truck or from one storage bin to another. More particularly, the invention can be easily transported from one site to another and easily maneuvered and adjusted on a particular site to convey grain from one point to another. This is particularly significant when working in a confined area with a number of bins, and with restricted access to the bins and other points of intake or discharge.

2. Description of the Prior Art

Prior art grain conveyors have lacked the transportability, maneuverability and adjustability of the present invention. For example, apparatus such as that disclosed in the U.S. Pat. Nos. to Beldin (2,610,727), Wilcoxen (2,746,592), Coats et al. (3,189,168), Mayrath (3,249,210), Kopaska (3,379,301) and Oliver (4,142,621) cannot be folded for transport and the elevation of the intake and discharge ends of the conveyors shown cannot be selectively independently adjusted. When one end is raised the other end is lowered. These prior art devices accordingly lack the transportability, maneuverability and adjustability of the present invention.

Other prior art Pat. Nos. such as MeHarry (3,337,068), Davidow (3,550,793), Tyler (3,584,732) and Koehnen (3,719,268) disclose foldable grain conveyors mounted on a truck or trailer, combine, fertilizer or feed tank or portable feed mill or mixer. While these patents show various ways of folding a conveyor, none has the adjustability and maneuverability of the present invention.

The present invention also includes a sweep conveyor section for sweeping and conveying grain from a flat surface, such as the bottom of a storage bin, into the inclined intake conveyor section, a feature not disclosed in the prior art.

Permanently installed conveyor systems lack the flexibility, maneuverability and adjustability of the present invention. They are capable of use, of course, only at the site where installed and cannot be transported from site to site.

SUMMARY OF THE INVENTION

Accordingly the primary object of the present invention is to provide apparatus for conveying grain that is foldable for convenient transport from one site to another and that is maneuverable and adjustable for maximum flexibility and convenience.

Another object is to provide apparatus that has the capability of sweeping grain from a flat surface, such as the floor of a storage bin, and conveying it to a desired point.

A further object is to provide grain conveying apparatus that is maneuverable and adjustable from a position on the apparatus for maximum operator convenience.

A further object is to provide apparatus that can be operated either with or without a sweep capability and utilizing either a portion or all of the entire length of the conveyor.

A final object is to provide independent adjustability in the elevation of the intake point, the angle of the intake conveyor section, and the elevation of the discharge point of the conveyor.

These objects, as well as others, are achieved by the wheel mounted, foldable grain conveyor of the present invention comprising a frame mounted on wheels, an intermediate conveyor section adjustably mounted above the frame, an intake conveyor section pivotally mounted to the intake end of the intermediate conveyor section and a discharge conveyor section pivotally mounted to the discharge end of the intermediate conveyor section. The intermediate conveyor section is adjustably mounted above the frame with respect to the elevation of its intake end and its discharge end, which can be independently adjusted by the selective operation of respective hydraulic cylinders.

The frame of the invention is designed in the form of an isosceles triangle. The intermediate conveyor section is mounted on the frame with its longitudinal axis in the vertical plane passing through the altitude of the triangular frame for maximum stability. Wheels are provided at the respective corners of the frame. The front wheel is steerable for maneuverability. A gasoline motor is provided for power for propelling the apparatus and operating its other functions.

The intake conveyor section is pivotally mounted to the intermediate conveyor section for pivotal movement about a horizontal axis in a vertical plane passing through the longitudinal axis of the intermediate conveyor section. This movement from the extended work position to the folded transport position and vice versa is by pivoting upwardly over center in a vertical plane on the axis of the intermediate conveyor section. The discharge end of the intake conveyor section is disposed above the intake end of the intermediate conveyor section so that grain discharged from the intake conveyor section falls downwardly into the intake of the intermediate conveyor section. Means is provided for pivotally moving the intake conveyor section from the extended to the folded or retracted position in the form of a pair of hydraulic cylinders and a novel gear tooth arrangement.

The discharge conveyor section is hinge mounted to the intermediate conveyor section for pivotal movement about an axis spaced from the longitudinal axis of the intermediate conveyor section and defined by the intersection between a vertical plane and a plane perpendicular to the longitudinal axis of the intermediate conveyor section.

A unique sweep conveyor section is pivotally mounted to the intake conveyor section for pivotal movement about a horizontal axis for movement between a work and storage position and for pivotal movement about a vertical axis for sweeping and conveying grain from a flat surface, such as the floor of a storage bin, to the intake conveyor section. Means is provided for advancing or pivoting the sweep section about a vertical axis to accomplish the sweeping action and means is also provided for adjusting the length of the sweep section to accommodate storage bins of various diameter.

DESCRIPTION OF PREFERRED EMBODIMENT

Figures 1, 7:
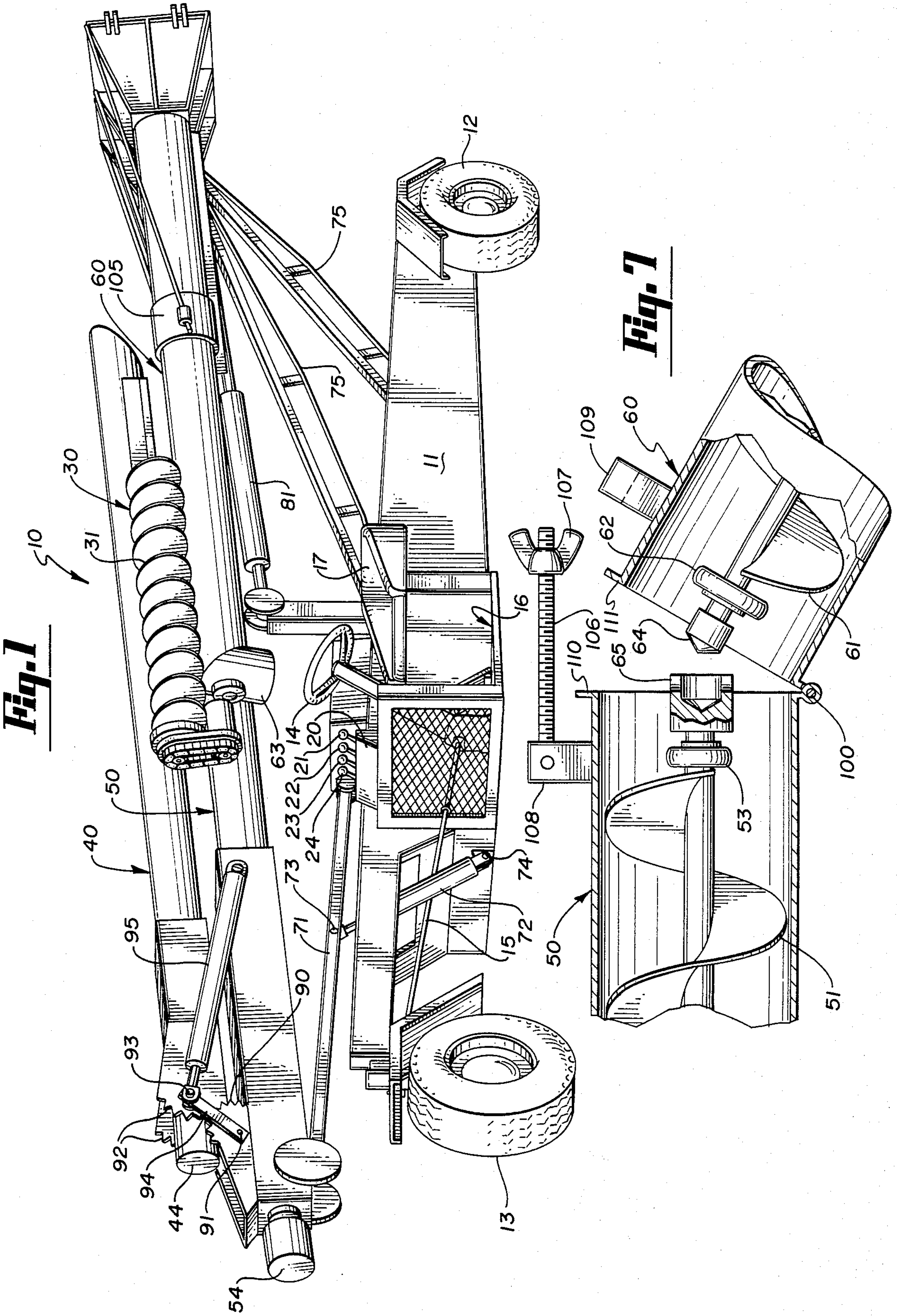
FIG. 1 is a perspective view of the grain conveying apparatus of the present invention in the folded transport position.
FIG. 7 is an axial sectional view of the hinged joint of FIGS. 5 and 6 taken on the line 7—7 of FIG. 5 with the hinged joint partially opened.

The grain auger 10 of the present invention is shown in the folded, transport position in FIG. 1. It is shown in the extended, work position in FIG. 2.

Figure 3:
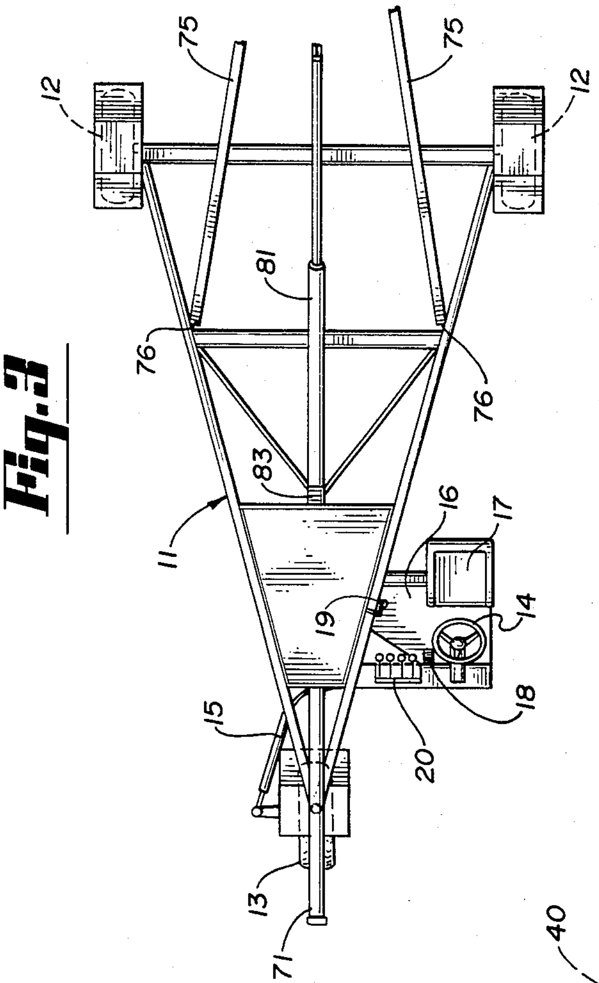
FIG. 3 is a top view of the wheel mounted frame taken on the line 3—3 of FIG. 2.

The grain auger apparatus includes a frame 11 formed in the shape of an isosceles triangle, best seen in FIG. 3, with a wheel mounted at each corner. The rear wheels 12 rotate about a fixed axis parallel to the base of the triangular frame. The front wheel 13 rotates about a horizontal axis that pivots about a vertical axis for steering. Front wheel 13 is driven by a hydraulic motor (not shown) and is steerable by means of steering wheel 14 and steering cable 15 in conventional manner. A platform 16 and seat 17 are provided for the operator. A gasoline motor and hydrostatic transmission (not shown) are mounted in conventional manner on frame 11 to propel the apparatus and to operate its work functions. A foot pedal 18 operates the swash plate control for the pump in the hydrostatic transmission that provides hydraulic pressure to the hydraulic motor (not shown) that drives the front wheel. Hand control 19 operates the swash plate control for the pump in the hydrostatic transmission that provides hydraulic pressure to the hydraulic motor that drives the augers (except for the sweep section motor). Valve bank 20, which includes valves 21, 22, 23 and 24, controls the work functions, as explained more particularly below.

Figure 2:
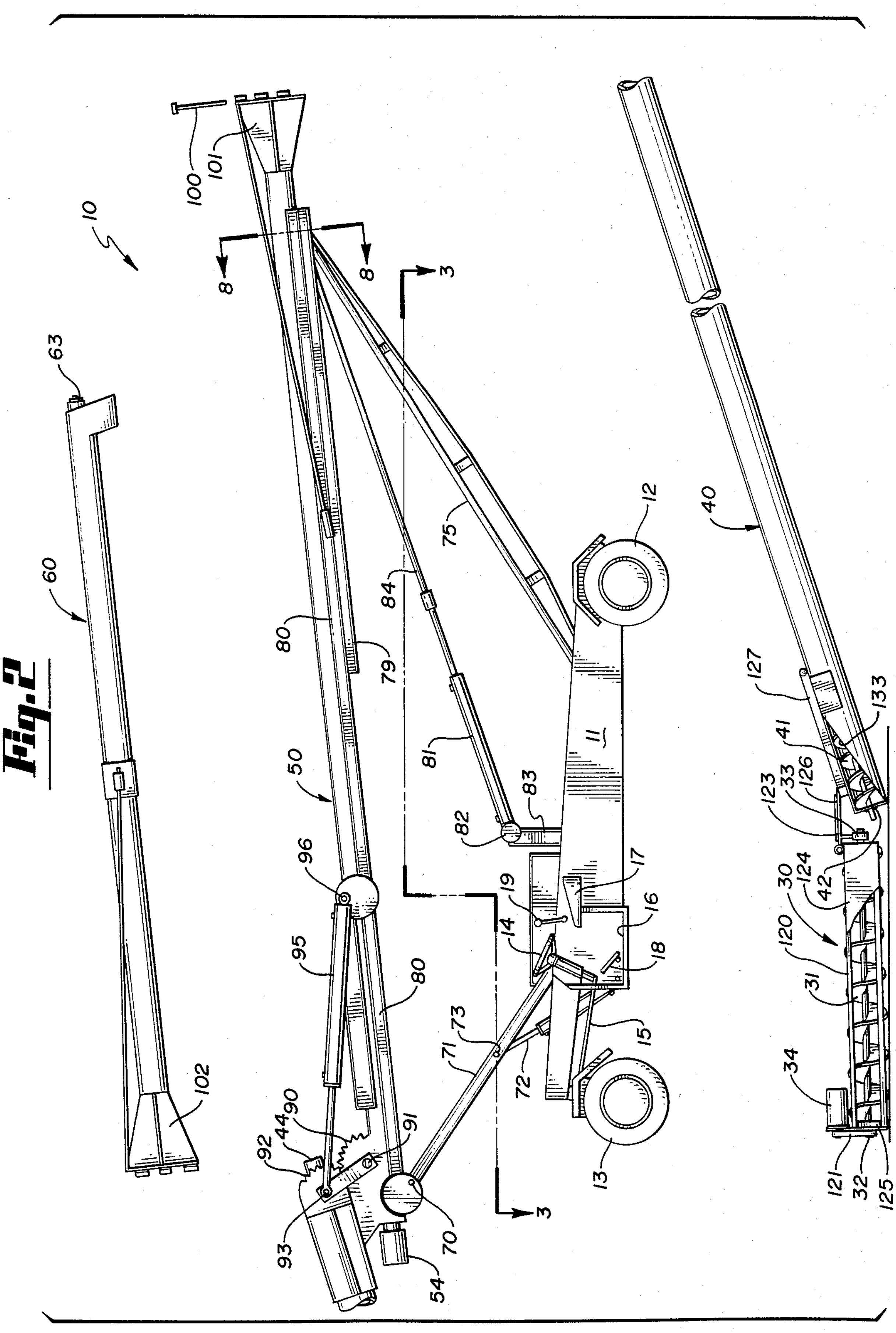
FIG. 2 is a partially exploded side view of the grain conveying apparatus in the extended working position.
Figures 4, 5, 6, 8:
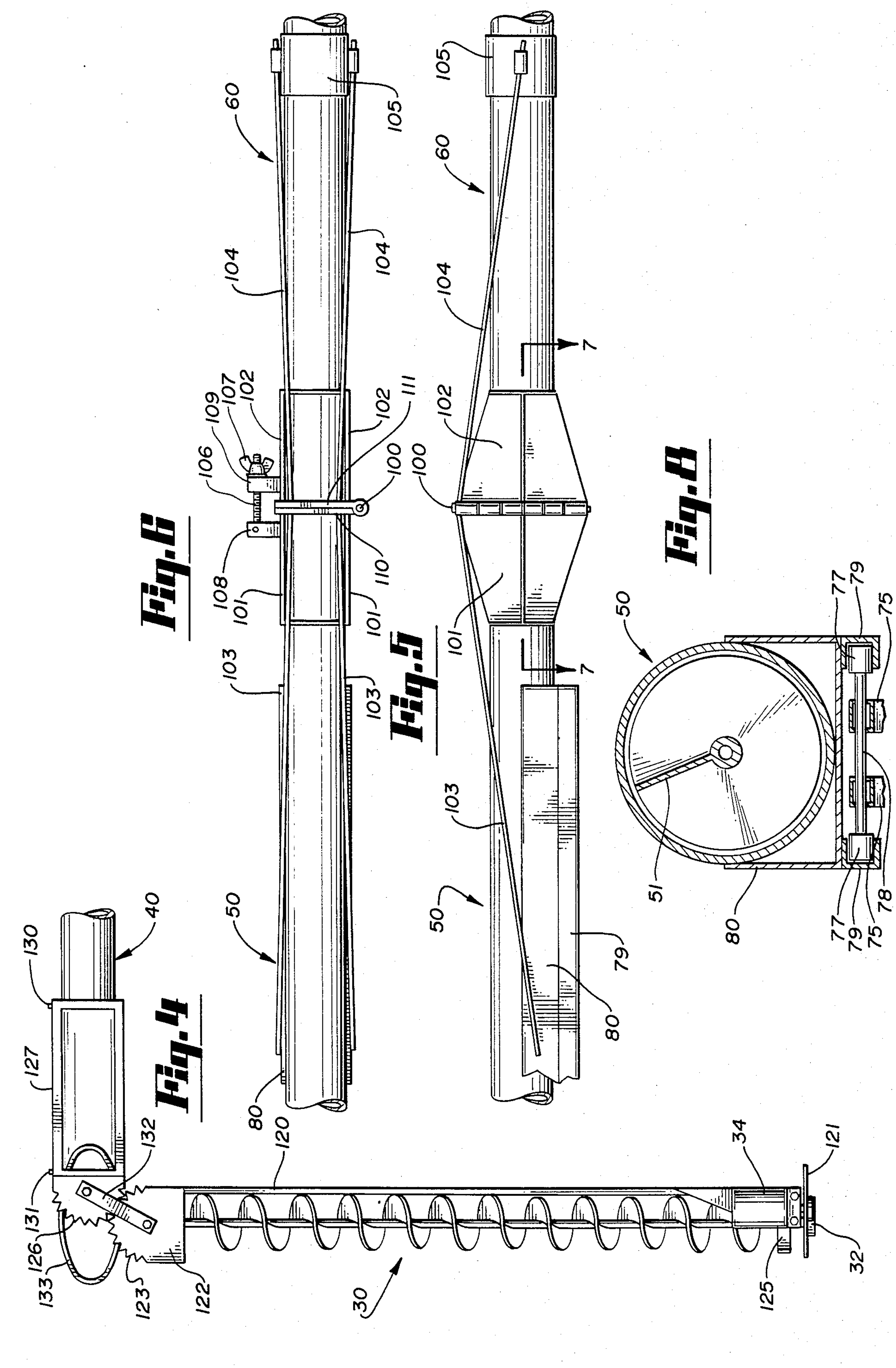
FIG. 4 is a top view of the sweep conveyor section of the grain conveying apparatus with the intake conveyor section shown partially.
FIG. 5 is a side view of the hinged joint between the intermediate conveyor section and the discharge conveyor section with the conveyor sections axially aligned in working position.
FIG. 6 is a top view of the hinged joint between the intermediate conveyor section and the discharge conveyor section shown in FIG. 5.
FIG. 8 is a sectional view taken on the line 8—8 of FIG. 2.

The conveyor sections include a sweep conveyor section 30 shown in FIGS. 1, 2 and 4, an intake conveyor section 40 shown in FIGS. 1, 2 and 4, an intermediate conveyor section 50, shown in FIGS. 1 and 2, and a discharge conveyor section 60 shown in FIGS. 1 and 2. In the preferred embodiment, sweep section 30 is eight (8) feet long, but extendable to sixteen (16) feet, intake section 40 is twenty (20) feet long, intermediate section 50 is thirty (30) feet long and discharge section 60 is twenty (20) feet long.

Sweep conveyor section 30 is mounted to intake conveyor section 40 for pivotal movement about a horizontal axis from the retracted storage position shown in FIG. 1 to the extended work position of FIGS. 2 and 4. In the work position of FIGS. 2 and 4, sweep section 30 is pivotable about a vertical axis to sweep a circular path.

Intake conveyor section 40 is pivotally mounted to intermediate conveyor section 50 for pivotal movement from the retracted transport portion of FIG. 1 to the extended work position of FIG. 2. The actuating mechanism for this pivotal movement is described more particularly below.

Intermediate conveyor section 50 is mounted above frame 11 with its longitudinal axis in a vertical plane passing through the altitude of triangular frame 11, as best seen in FIGS. 1 and 2. Each end of intermediate conveyor section 50 is adjustable upwardly and downwardly, independently of the opposite end, by a linkage described more particularly below.

Discharge conveyor section 60 is pivotally mounted to intermediate conveyor section 50.

A conventional auger-type conveyor is provided in each of the conveyor sections. Auger 31 in sweep section 30 is journaled in bearings 32 and 33 and is driven by hydraulic motor 34. Auger 41 in intake section 40 consists of two auger flights journaled at the intake end of intake conveyor 40 at 42 and at the discharge end at 43. An intermediate bearing (not shown) is located midway between the ends of intake conveyor section 40. Auger 41 is driven by hydraulic motor 44 shown in FIGS. 1, 2 and 9.

Auger 51 in intermediate conveyor section 50 is journaled at bearings 52 at the intake end, in bearings 53 (See FIG. 7) at the discharge end, and in intermediate bearings (not shown) spaced in the interior of the section. Auger 50 is driven by hydraulic motor 54.

Auger 61 in discharge conveyor section 60 is journaled at one end in bearings 62 (See FIG. 7) and at the opposite end in bearings 63 (See FIGS. 1 and 2). Auger 61 is driven by hydraulic motor 54, which drives auger 51 in intermediate conveyor section 50, and, through the bayonet 64 and cog 65 construction shown in FIG. 7, which aligns and rotationally fixes the shaft of auger 51 to auger 61 when the connection is closed, auger 61 as well. Auger 61 thus rotates with and is driven by auger 51.

Intermediate conveyor section 50 is mounted to frame 11 to provide for independent adjustment of the elevation of each end thereof, as best seen in FIGS. 1 and 2. The intake end of intermediate conveyor section 50 is pivotally mounted at point 70 to lifting arms 71, which, in turn, are pivotally mounted to frame 11. Hydraulic cylinder 72 is pivotally mounted to lifting arms 71 at 73 and to frame 11 at 74 so that when extended and retracted, lifting arms 71 pivot upwardly and downwardly from the transport position of FIG. 1 to the elevated work position of FIG. 2. The discharge end of intermediate conveyor section 50 is also mounted for upward and downward movement. Compression members 75 extend from a pivotal mounting on frame 11 at 76 upwardly and rearwardly to rollers 77 mounted on shaft 78 for sliding movement in channel track members 79, shown in FIG. 8. Channel track members 79 extend a substantial distance along the bottom of intermediate conveyor section 50, as shown in FIG. 2. A stiffening channel 80 is welded to intermediate conveyor section 50 throughout substantially its entire length. Hydraulic cylinder 81 extends from a pivotal mounting at 82 on post 83 secured to frame 11 to a pivotal mounting on shaft 78. Thus, as hydraulic cylinder 81 retracts and is extended, compression members 75 pivot upwardly and downwardly from the transport position of FIG. 1 to the extended work position on FIG. 2. Rollers 77 roll in channel track members 79 as compression members 75 pivot. It should be noted that hydraulic cylinder 81, including extension member 84 is always in tension due to the dead weight of intermediate conveyor section 50, and compression members 75 are always in compression. The discharge end of intermediate conveyor section 50 is thus adjustable upwardly and downwardly, and this adjustment is independent of the vertical adjustment of the intake end.

Figure 10:
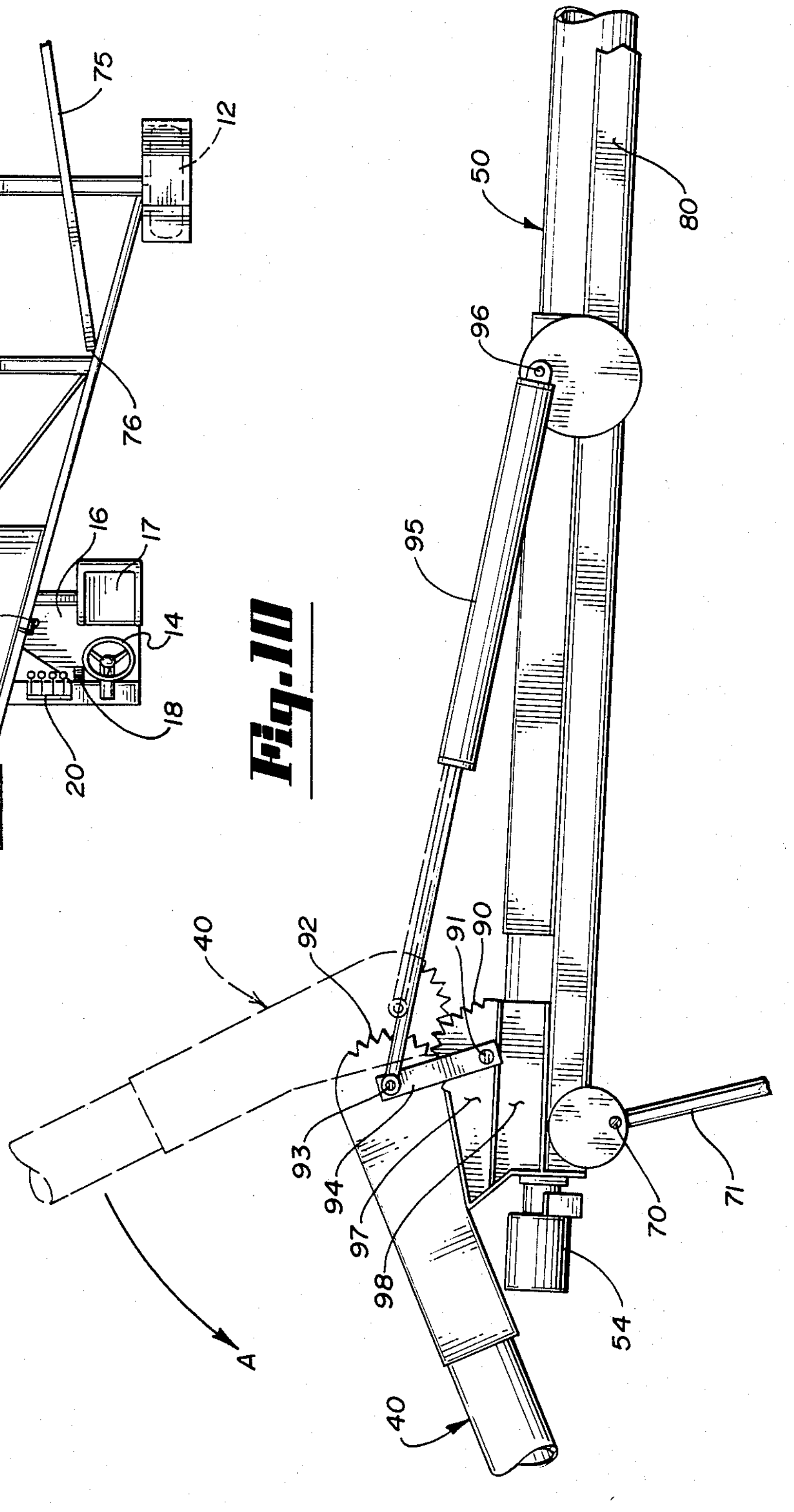
FIG. 10 is a side view of the elbow joint shown in FIG. 9 with the intake conveyor section shown in its lowered working position in solid lines and in a raised transitional position in dotted lines.
Figure 9:
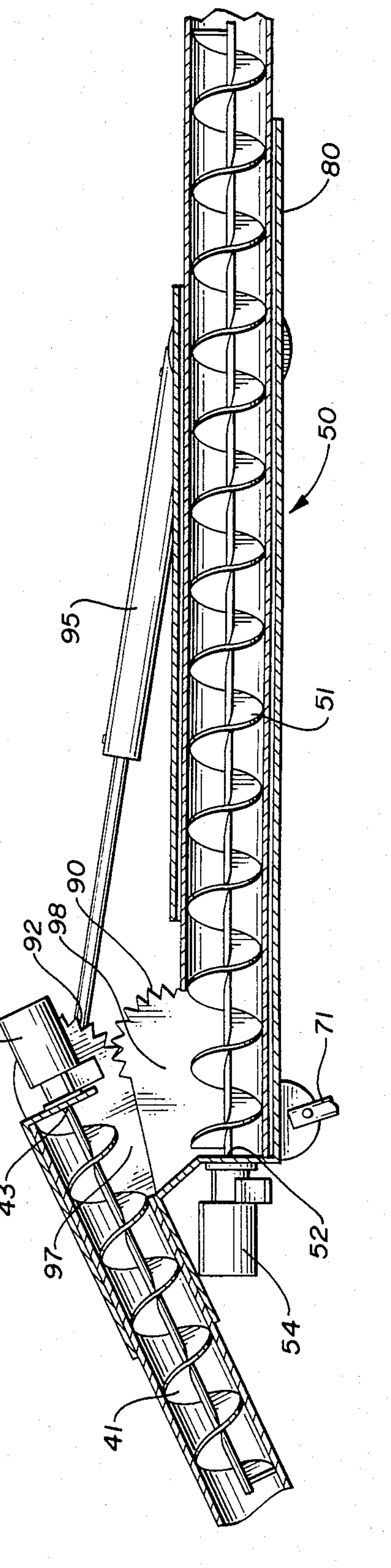
FIG. 9 is an axial sectional view of a portion including the discharge end of the intake conveyor section and a portion, including the intake end, of the intermediate conveyor section showing the relationship at the elbow joint between them.

The pivotal relationship between intake conveyor section 40 and intermediate conveyor section 50, and the means for pivoting the intake conveyor section 40 with respect to the intermediate conveyor section 50, are best seen in FIGS. 2, 9 and 10. Intake conveyor section 40 is pivotally mounted to the intake end of intermediate conveyor section 50 for movement about a horizontal axis above intermediate conveyor section 50 so that discharge from intake conveyor section 40 falls downwardly into the intake end of intermediate conveyor section 50, best seen in FIG. 9. A first spaced pair of circular gear teeth 90 directed generally upwardly and disposed on a common axis 91 is mounted to the intake end of intermediate conveyor 50. The gears 90 are fixed to intermediate conveyor section 50 and spaced along the common axis 91 a distance substantially equal to the outside diameter of intermediate conveyor section 50, which is about eight to nine inches. A second spaced pair of circular gear teeth 92 is fixed to intake conveyor section 40 at the discharge end thereof in respective engagement with gear teeth 90. Gear teeth 92 are disposed on common horizontal axis 93. Straps 94 are pivotally mounted at axis 91 and axis 93, on each side of spaced gear teeth 90 and 92, and serve as means for maintaining the first spaced pair of gear teeth 90 and second spaced pair 92 in engagement. A spaced pair of hydraulic cylinders 95 extends from each side of intermediate conveyor section 50, pivotally mounted at points 96, respectively, to axis 93 of gear teeth 92 on intake conveyor section 40. Hydraulic cylinders 95, together with the gear teeth described, provide means for pivoting intake conveyor 40 upwardly about a horizontal axis, from a retracted transport position shown in FIG. 1, to an extended work position shown in FIGS. 2, 9 and 10, as hydraulic cylinders 95 retract and extend, respectively. It should be noted that in the retracted or folded transport position shown in FIG. 1, intake conveyor section 40 is folded back and rests upon intermediate conveyor section 50. In the fully extended position the edges of gusset plates 97 and 98 abut as shown in FIG. 9.

The pivotal joint between intermediate conveyor section 50 and discharge conveyor section 60 is best seen in FIGS. 5, 6 and 7. The section pivots about hinge pin 100 which connects hinge plates 101 and 102 mounted to opposite sides of intermediate conveyor section 50 and discharge conveyor section 60. Tension rods 103 and 104 extend from stiffening channel 80 of intermediate conveyor section 50, and from collar 105 of discharge conveyor section 60, to the upper corners of hinge plates 101 and 102, respectively, on both sides. Tension rods 103 and 104 serve to distribute the large bending moment at hinge pin 100 and increase the rigidity of the joint. Means for securing the joint in the closed position with the axis of the two conveyor sections in registration and the bayonet 64 and cog 65 connection between the auger shafts in the two sections closed is provided in the form of bolts 106, wing nuts 107 and brackets 108 and 109. A face plate 110, with a circular opening in registration with the conveyor opening is mounted perpendicularly to the axis of the intermediate conveyor section, and a similar face plate 111 is mounted similarly to discharge conveyor section 60, as shown in FIGS. 6 and 7. These face plates 110 and 111 are in engagement when the joint is closed as shown in FIGS. 5 and 6. Discharge conveyor section 60 is thus mounted to intake conveyor section 50 for pivotal movement about an axis, the axis of hinge pin 100, defined by the intersection of a vertical plane spaced from the longitudinal axis of the intermediate conveyor section (the vertical plane that includes the axis of hinge pin 100) and a plane perpendicular to the axis of intermediate conveyor section 50 (the plane defined by the interface between face plate 110 and face plate 111). Discharge conveyor section 60 is therefore swingable (by hand) from the folded position of FIG. 1 to the extended position of FIGS. 2, 5 and 6. A saddle (not shown) is provided on the side of intermediate conveyor section 50 for supporting discharge conveyor section 60 in the folded or retracted position of FIG. 1.

The sweep section 30 and its pivotal mounting to intake section 40 is best seen in FIGS. 2 and 4. Sweep section 30 includes a main frame member 120, which telescopes to adjust the length of the sweep section (requiring insertion of an additional auger flight), vertical end plate 121 and horizontal end plate 122, which includes circular gear teeth 123. Auger 31 is journaled in bearing 32 in end plate 121 at one end and at bearing 33 mounted to horizontal end plate 122 at the other end. A skirt 124 extends downwardly from frame member 120. Hydraulic motor 34 is mounted to end plate 121 and drives auger 31 and and drive wheel 125, which engages the supporting surface when sweep section 30 is in the working position shown in FIGS. 2 and 4. Drive wheel 125 advances the section, as auger 31 eats into the grain being conveyed, in a sweeping movement. During the sweeping movement gear teeth 123 engage gear teeth 126 mounted to rectantular bracket 127. Rectangular bracket 127 is pivotally mounted to intake conveyor 40 at hinge pin 130, and gear plate 126 is pivotally mounted to the other end of rectangular bracket 127 at hinge pin 131. Gear teeth 123 and 126 are held in engagement by strap member 132, which is pivotally mounted to gear teeth plates 123 and 126 at the center of curvature of the circular gear teeth pattern. Intake conveyor section 50 is provided with a beveled, eliptical opening shown at 133 in FIG. 4, so that auger 31 in intake conveyor section 30 is exposed, and discharge from auger 31 is picked up efficiently by auger 41 of intake conveyor section 40.

Sweep section 30 is moved (by hand) from the retracted position of FIG. 1 to the extended work position of FIGS. 2 and 4 by pivoting bracket 127 about the axis of hinge pin 130 and pivoting sweep section 30 about the axis of hinge pin 131. Retraction is accomplished by the identical movement in the opposite direction.

It should be noted that bracket 127 serves to locate sweep section a significant distance (roughly the length of bracket 127) rearwardly of intake 133 of intake conveyor section 40, so that intake conveyor section 40 can be inserted into a storage bin and used without use of the sweep section. This is the standard method of use when a a storage bin is full. The sweep section is used only after the bin has been emptied to the point where the depth and natural angle of repose of the grain prevents grain from feeding by gravity into intake conveyor section 40.

Figure 11:
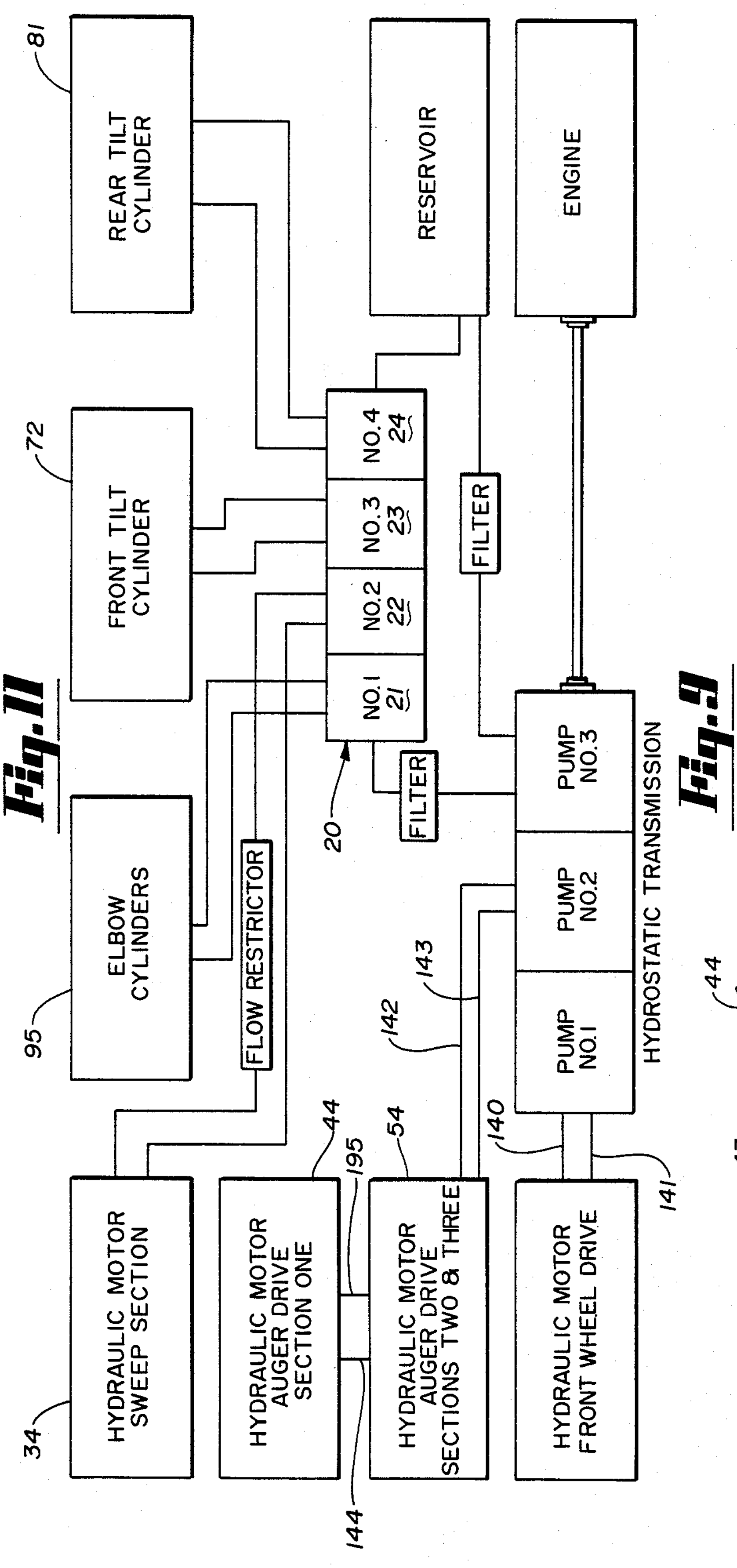
FIG. 11 is a hydraulic circuit diagram showing the manner in which the hydraulic motor and cylinders are actuated and controlled.

The hydraulic circuit for propelling the grain conveyor of the present invention and for operating the hydraulic motors and cylinders is shown in FIG. 11. In the preferred embodiment a 35 horsepower at 3000 rpm Wisconsin gasoline engine Model W4-1770 is used to drive a Sperry Vickers 19 series hydrostatic transmission Model TA 1919V10 Double Pump, a swash plate type transmission. One swash plate controlled pump in the hydrostatic transmission is connected to the hydraulic motor that drives the front wheel. Movement of foot pedal 18 controls the swash plate position, which controls the amount and direction of flow in lines 140 and 141 thereby controlling the direction and speed of the hydraulic motor that drives front wheel 13. The second swash plate controlled pump is connected by lines 142 and 143 to hydraulic motor 54, which is series connected through lines 144 and 145 to hydraulic motor 44. Hand control 19 controls the swash plate position of the second pump to control the amount and direction of flow to hydraulic motors 44 and 54, thus controlling the speed and direction of augers 41, 51 and 61. The charge pump in the hydrostatic transmission feeds valve bank 20, the valves of which control hydraulic motor 34 on the sweep section and hydraulic cylinders 95, 72 and 81, respectively.

In the preferred embodiment valve bank 20, including valves 21, 22, 23 and 24, is a series (parallel stacked) of Energy Hydraulic (Monticello, Iowa 52310) Model CVP directional control valves. Valve 21 is a 4-way, 4 position float valve to extend, retract, lock and float hydraulic cylinders 95. Valves 22, 23 and 24 are 4-way, 3 position valves to extend, retract and lock hydraulic motor 34 and hydraulic cylinders 72 and 81, respectively. A flow restriction valve in the line running to hydraulic motor 34 provides for adjustment of the speed of auger 31 in sweep conveyor section 30.

Suitable hydraulic motors 44 and 54 for driving augers 41 and 51 at 0–500 rpm are TRW-Ross Model MAE 14010.

A suitable hydraulic motor drive for front wheel 13 is a TRW-Ross Model MWA-24, and a suitable hydraulic motor for driving the sweep section at 0–400 rpm is an Eaton Char Lynn Model 101-1007-007.

In operation the conveyor 10 is pulled or driven in the transport position of FIG. 1 to the location of use, and maneuvered into position by drive wheel 13 and steering wheel 14. Conveyor 10 is then extended by actuating cylinder 95, which pivots intake conveyor section 40 into an extended position, through the transitional position shown in dotted lines in FIG. 10, in the direction of arrow, A, to the extended work position of FIGS. 10 and 2. Discharge conveyor section 60 can then be swung (by hand) and secured by wing nuts 17 into the extended position of FIGS. 2, 5 and 6. The position of the discharge end of discharge conveyor 60 can be adjusted and the position of the intake end of intake conveyor 40 can be adjusted by operation of tilt cylinders 81 and 71, respectively, and by maneuvering the unit with drive wheel 13, foot pedal 18 and steering wheel 14. Through adjustment and maneuvering the intake can be inserted into a grain storage bin, a truck box or other container, and the discharge point can also be adjusted as desired. Hydraulic motors 44 and 54 are then actuated by hand control 19 and augers 41, 51 and 61 convey the grain, discharging it where desired.

When the storage bin becomes nearly empty, the intake conveyor section 40 is removed by maneuvering the unit, and sweep conveyor section 30 is extended. Sweep conveyor 30 is then inserted into the bin, hydraulic motor 34 is actuated, along with hydraulic motors 44 and 54, and the sweep section pivots about a vertical axis in the direction of arrow, B, in FIG. 4, advancing through the driving action of drive wheel 125. Grain is thus conveyed to opening 133 of intake conveyor section 40 discharging through discharge conveyor section 60.

If desired grain can be discharged directly from the discharge end of intermediate conveyor section 50, with discharge conveyor section 60 swung into its retracted or folded position. In this mode of operation an auxiliary downspout (not shown) can be mounted over the discharge end of intermediate conveyor section 50.

When the conveying is completed, conveyor 10 can be folded into the transport position of FIG. 1, by the reverse of the extension procedure, and the conveyor can be transported or moved to another location.

Having thus described the invention, the following is claimed:

1. Wheel-mounted, foldable grain conveying apparatus comprising:

a. a frame in the form of an isosceles triangle disposed substantially in a horizontal plane, mounted on wheels disposed at the respective corners of said frame for rotation about a horizontal axis perpendicular to the altitude of said triangle;

b. means for driving and steering the wheel at the apex of the triangle;

c. an intermediate conveyor section having an intake end and a discharge end mounted on and above said frame;

d. means for mounting said intermediate conveyor section above said frame with its longitudinal axis in a vertical plane passing through the altitude of the triangle and with said intake end above the apex of the triangle, and independently selectively varying the elevation of said intake end and said discharge end;

e. an intake conveyor section pivotally mounted to said intake end of said intermediate conveyor section for pivotal movement in a vertical plane passing through the longitudinal axis of said intermediate conveyor section about a horizontal axis above said intake of said intermediate conveyor section so that grain discharged from said intake conveyor section falls downwardly into the intake end of said intermediate conveyor section;

f. means for pivoting said intake conveyor section about said horizontal axis in said vertical plane from an extended position extending downwardly from said intake end of said intermediate conveyor section to a retracted position above and resting upon said intermediate conveyor section which comprises:

(1) a first spaced pair of circular gear teeth directed upwardly and disposed on a first common horizontal axis transverse to the longitudinal axis of said intermediate conveyor section at the intake end of and fixed to said intermediate conveyor section, (2) a second spaced pair of circular gear teeth disposed on a second common horizontal axis transverse to the longitudinal axis of said intake conveyor section at the discharge end of and fixed to said intake conveyor section in respective engagement with said first spaced pair of circular gear teeth, (3) means for maintaining said first and second pair of spaced gear teeth in respective engagement, and (4) a spaced pair of double-acting hydraulic cylinders fixed to and extending respectively from said intermediate conveyor section to said second spaced pair of circular gear teeth; and g. a discharge conveyor section pivotally mounted to said discharge end of said intermediate conveyor section.

2. Wheel-mounted, foldable, grain conveying apparatus comprising:

a. a frame mounted on wheels;

b. an intermediate conveyor section having an intake end and a discharge end;

c. means for mounting said intermediate conveyor section longitudinally above said frame and independently selectively varying the elevation of said intake end and said discharge end;

d. an intake conveyor section pivotally mounted to said intake end of said intermediate conveyor section for pivotal movement in a vertical plane passing through the longitudinal axis of said intermediate conveyor section about a horizontal axis above said intake of said intermediate conveyor section so that grain discharged from said intake conveyor section falls downwardly into the intake end of said intermediate conveyor section;

e. means for pivoting said intake conveyor section about said horizontal axis in said vertical plane from an extended position extending downwardly from said intake end of said intermediate conveyor section to a retracted position above and resting upon said intermediate conveyor section which comprises:

(1) a first spaced pair of circular gear teeth directed upwardly and disposed on a first common horizontal axis transverse to the longitudinal axis of said intermediate conveyor section at the intake end of and fixed to said intermediate conveyor section, (2) a second spaced pair of circular gear teeth disposed on a second common horizontal axis transverse to the longitudinal axis of said intake conveyor section at the discharge end of and fixed to said intake conveyor section in respective engagement with said first spaced pair of circular gear teeth, (3) means for maintaining said first and second pair of spaced gear teeth in respective engagement, and (4) a spaced pair of double-acting hydraulic cylinders fixed to and extending respectively from said intermediate conveyor section to said second spaced pair of circular gear teeth; and f. a discharge conveyor section pivotally mounted to said discharge end of said intermediate conveyor section.

3. Wheel-mounted, foldable grain conveying apparatus comprising:

a. a frame in the form of an isosceles triangle disposed substantially in a horizontal plane, mounted on wheels disposed at the respective corners of said frame for rotation about a horizontal axis perpendicular to the altitude of said triangle;

b. means for driving and steering the wheel at the apex of the triangle;

c. an intermediate conveyor section having an intake end and a discharge end mounted on and above said frame;

d. means for mounting said intermediate conveyor section above said frame with its longitudinal axis in a vertical plane passing through the altitude of the triangle and with said intake end above the apex of the triangle, and independently selectively varying the elevation of said intake end and said discharge end;

e. an intake conveyor section pivotally mounted to said intake end of said intermediate conveyor section for pivotal movement in a vertical plane passing through the longitudinal axis of said intermediate conveyor section about a horizontal axis above said intake of said intermediate conveyor section so that grain discharged from said intake conveyor section falls downwardly into the intake end of said intermediate conveyor section;

f. means for pivoting said intake conveyor section about said horizontal axis in said vertical plane from an extended position extending downwardly from said intake end of said intermediate conveyor section to a retracted position above and resting upon said intermediate conveyor section which comprises:

(1) a first spaced pair of circular gear teeth directed upwardly and disposed on a first common horizontal axis transverse to the longitudinal axis of said intermediate conveyor section at the intake end of and fixed to said intermediate conveyor section, (2) a second spaced pair of circular gear teeth disposed on a second common horizontal axis transverse to the longitudinal axis of said intake conveyor section at the discharge end of and fixed to said intake conveyor section in respective engagement with said first spaced pair of circular gear teeth, (3) means for maintaining said first and second pair of spaced gear teeth in respective engagement, and (4) a spaced pair of double-acting hydraulic cylinders fixed to and extending respectively from said intermediate conveyor section to said second spaced pair of circular gear teeth; and g. a discharge conveyor section mounted to said intermediate conveyor section for pivotal movement about an axis defined by the intersection of a vertical plane spaced from and a plane perpendicular to the longitudinal axis of said intermediate conveyor section from an extended position with the axis of said discharge conveyor section co-incident with the axis of said intermediate conveyor section to a retracted position with said axis of said discharge conveyor section parallel to and spaced from said axis of said intermediate conveyor section.

4. Foldable, grain conveying apparatus comprising:

a. an intermediate conveyor section having an intake end and a discharge end;

b. means for mounting said intermediate conveyor section and independently selectively varying the elevation of said intake end and said discharge end;

c. an intake conveyor section pivotally mounted to said intake end of said intermediate conveyor section for pivotal movement in a vertical plane passing through the longitudinal axis of said intermediate conveyor section about a horizontal axis above said intake of said intermediate conveyor section so that grain discharged from said intake conveyor section falls downwardly into the intake end of said intermediate conveyor section;

d. means for pivoting said intake conveyor section about said horizontal axis in said vertical plane from an extended position extending downwardly from said intake end of said intermediate conveyor section to a retracted position above and resting upon said intermediate conveyor section which comprises:

(1) a first spaced pair of circular gear teeth directed upwardly and disposed on a first common horizontal axis transverse to the longitudinal axis of said intermediate conveyor section at the intake end of and fixed to said intermediate conveyor section, (2) a second spaced pair of circular gear teeth disposed on a second common horizontal axis transverse to the longitudinal axis of said intake conveyor section at the discharge end of and fixed to said intake conveyor section in respective engagement with said first spaced pair of circular gear teeth, (3) means for maintaining said first and second pair of spaced gear teeth in respective engagement, and (4) a spaced pair of double-acting hydraulic cylinders fixed to and extending respectively from said intermediate conveyor section to said second spaced pair of circular gear teeth; and e. a discharge conveyor section pivotally mounted to said discharge end of said intermediate conveyor section.

* * * * *